US007077738B2

(12) United States Patent
Benson et al.

(10) Patent No.: US 7,077,738 B2
(45) Date of Patent: Jul. 18, 2006

(54) APPARATUS FOR AND METHOD OF PROCESSING MEAT

(75) Inventors: Shaughn Michael Benson, Pierson, IA (US); John E. Johnson, Jefferson, SD (US)

(73) Assignee: Tyson Fresh Meats, Inc., Springdale, AR (US)

( * ) Notice: Subject to any disclaimer, the term of this patent is extended or adjusted under 35 U.S.C. 154(b) by 156 days.

(21) Appl. No.: 10/249,275

(22) Filed: Mar. 27, 2003

(65) Prior Publication Data

US 2003/0186638 A1 Oct. 2, 2003

Related U.S. Application Data

(60) Provisional application No. 60/368,945, filed on Mar. 29, 2002.

(51) Int. Cl.
*A22C 18/00* (2006.01)

(52) U.S. Cl. .................................................... 452/149

(58) Field of Classification Search ................ 452/149, 452/173, 131, 123
See application file for complete search history.

(56) References Cited

U.S. PATENT DOCUMENTS 3,603,102 A * 9/1971 Banas .......................... 62/64
3,740,795 A * 6/1973 Cox .............................. 452/5
3,829,933 A * 8/1974 Lambert ...................... 452/19
4,020,528 A * 5/1977 Lindbladh et al. .......... 452/131
4,193,373 A * 3/1980 Hanson et al. ................ 118/17
4,217,679 A * 8/1980 Gordon ...................... 452/140
5,195,921 A * 3/1993 Ledet ............................ 452/4
5,902,177 A * 5/1999 Tessier et al. ............. 452/156
6,019,033 A * 2/2000 Wilson et al. ................ 99/470
6,383,068 B1 * 5/2002 Tollett et al. .............. 452/170
6,601,499 B1 * 8/2003 Bifulco ........................ 100/73

OTHER PUBLICATIONS

Hobart Corporation, Instruction Manual Diagram for the Model ABR-1U Automatic Bone Dust Remover, p. 14.
Bettcher Industries, Inc. Foodservice Group, Automatic Batter-Breading System, website printout dated Nov. 16, 2001.

* cited by examiner

*Primary Examiner*—Thomas Price
(74) *Attorney, Agent, or Firm*—Blackwell Sanders Peper Martin LLP; Mark E. Stallion

(57) ABSTRACT

An apparatus for and method of cleaning cutting residue from one or both sides of cut meat. Meat, after being cut, for example with a band saw or the like, is passed through a curtain of fluid to impinge fluid on to at least one side of the meat for removing a substantial portion of the deleterious residue. The cleaned meat surface may then be passed through a drying area for removing cleaning fluid if the cleaning fluid contains liquid. After passing through a drying zone, brine or other ingredients may be applied to one or both sides of the cut meat.

18 Claims, 4 Drawing Sheets

Fig-4-
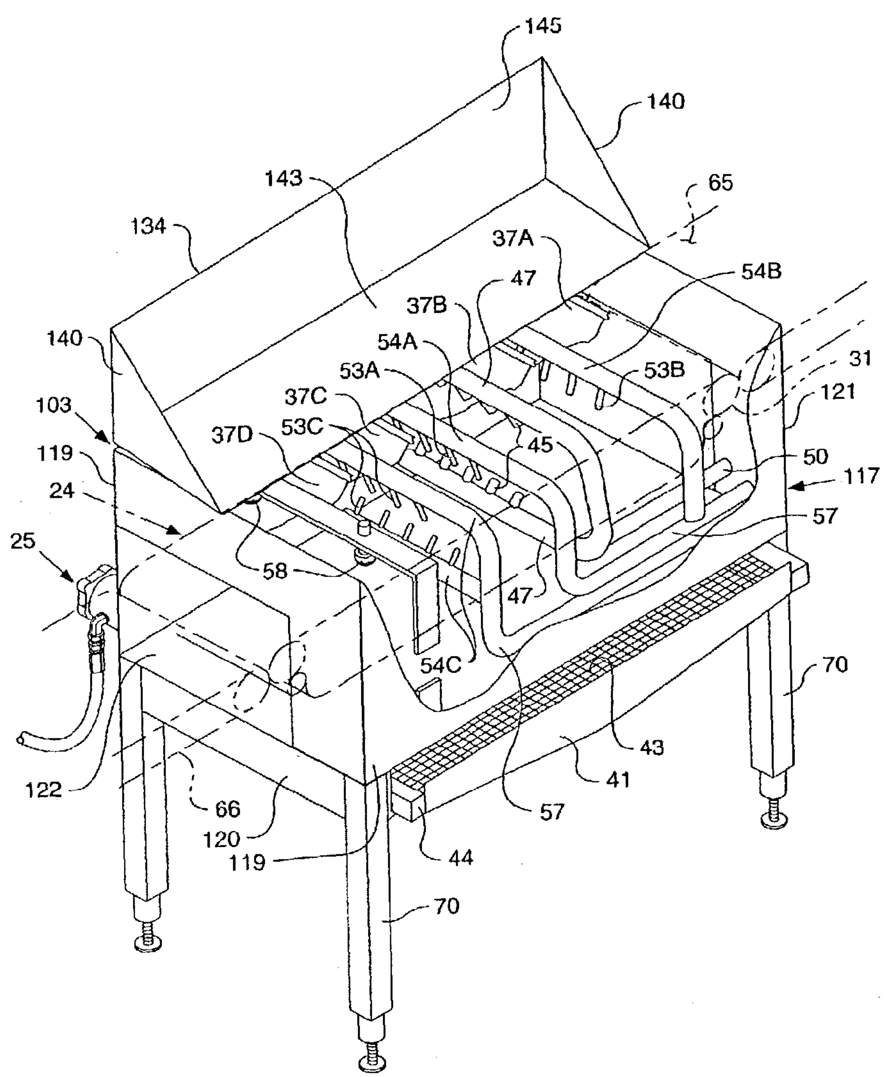

APPARATUS FOR AND METHOD OF PROCESSING MEAT

CROSS REFERENCE TO RELATED APPLICATIONS

This application claims the benefit of U.S. Provisional Patent Application No. 60/368,945 filed Mar. 29, 2002 entitled APPARATUS FOR AND METHOD OF PROCESSING MEAT.

BACKGROUND OF INVENTION

The present invention relates to apparatus and method for removing cutting residue from the surfaces of cut meat. The cutting residue is formed when meat is cut, for example, with a band saw, into discreet pieces.

In the processing of cut meat, residue, which is the result of the cutting process, is left on the cut surface of the meat. Such residue includes bone meal, bone marrow, fat, protein and other components freed or formed during the cutting process. Such residue remains on the cut surface of the meat and it is believed to be a quality and product appearance negative for consumers.

Means have been devised in the past to remove the cutting residue. One residue remover is a machine made by Hobart. The Hobart machine removes residue by scraping the meat surface. These machines are no longer made, are high maintenance, slow, not very effective in the removal of the residue, require manual handling of the meat resulting in reduced shelf life, and reduce yield. These machines can also leave undesirable deformations on a scraped surface.

Another method and means for removing the residue is hand scraping one or both (at least the one to be viewed by consumers) of the cut surfaces. This is very labor intensive and thus expensive. It is also monotonous work and therefore makes it difficult to find help who want to perform the task. Hand scraping may also increase the incidence of repetitive motion and ergonomic injury. Hand scraping also is not very effective at removing the residue, leaving unacceptable quantities of residue behind. Scraping can embed cut bone material into the meat making it difficult to remove and resulting in it being left in the meat. The retention of bone material does not present a product safety issue but can be a product appearance negative. Scraping also reduces yield by removing non-deleterious material from the meat surface. Scraping may lead to the transfer of deleterious material from one piece of cut meat to subsequent pieces of cut meat increasing the risk of spreading contamination. Because hand scraping permits only the scraping of one side of a piece of cut meat at a time, further labor must be expended in order to turn the meat if both sides are to be cleaned of residue. Hand scraping is often done in combination with the use of the mentioned Hobart machine to improve the effectiveness of the scraping process.

Thus, there is a need in the meat industry for an improved means for and method of removing cutting residue from cut meat reducing hand labor and improving the appearance and yield of cut meat.

SUMMARY OF INVENTION

The present invention involves the provision of an apparatus that utilizes a stream of fluid impinging on one or both sides of the meat simultaneously or sequentially to remove residue from the surface of the meat. After removal of the residue, the meat may be transferred to a brine applicator to apply brine to the cleaned surface to enhance its appearance and to provide, if desired, compounds to improve shelf life and/or appearance of the cut meat. Compounds may also be added to the brine to enhance flavor and texture of the meat.

The present invention also involves the provision of a method for cleaning cut meat which involves impinging a stream of fluid onto the cut meat surface to remove a substantial portion of the deleterious cutting residue therefrom. After removal of the residue, brine may be applied to the surface, if desired, to enhance the appearance of the cut meat surface and to apply certain compounds to improve the shelf life of the cut meat. Compounds may also be added to the brine to enhance flavor and texture of the meat.

BRIEF DESCRIPTION OF DRAWINGS

FIG. 4 is a perspective view of another alternative embodiment of the present invention.

Like numerals throughout the various drawings designate like or similar parts.

DETAILED DESCRIPTION

Figure 1:
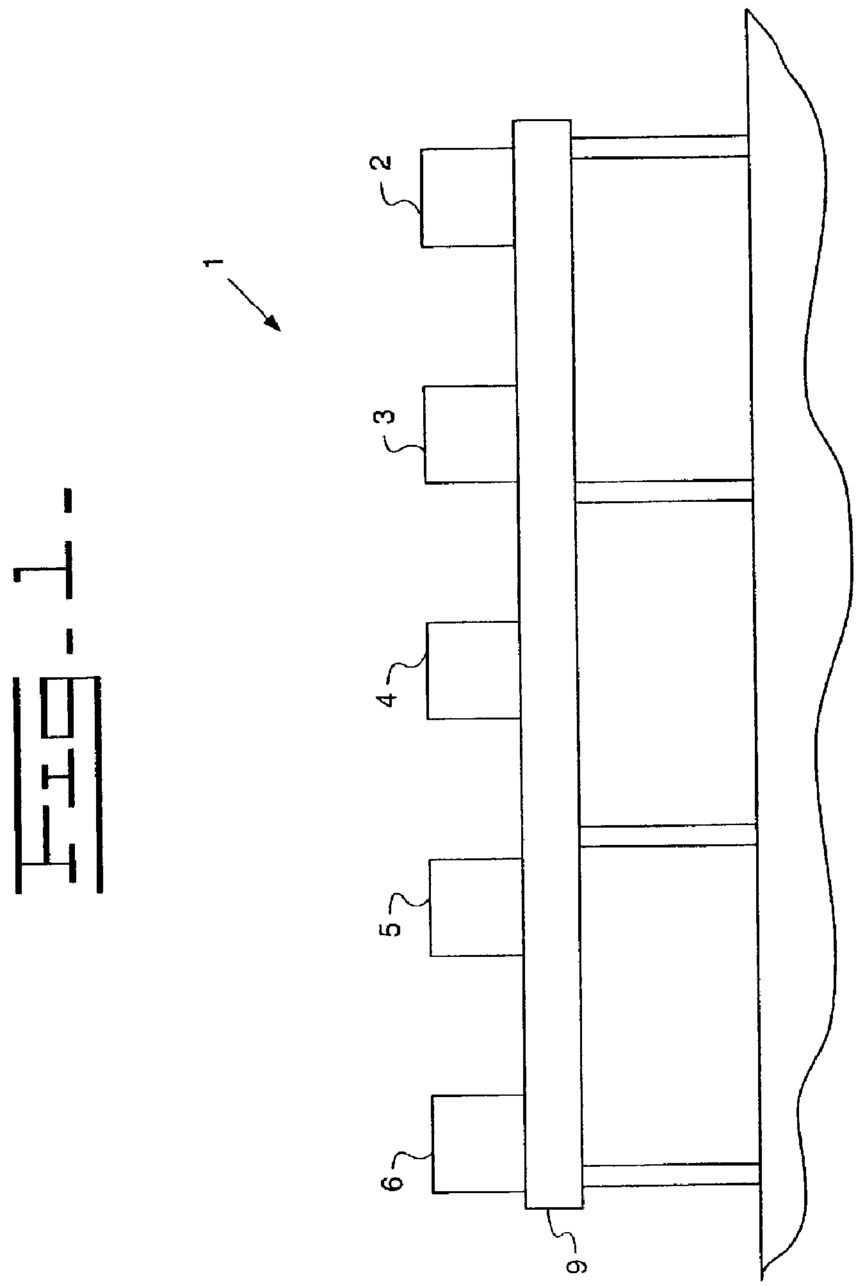
FIG. 1 is a schematic illustration of a meat processing line.
Figure 2:
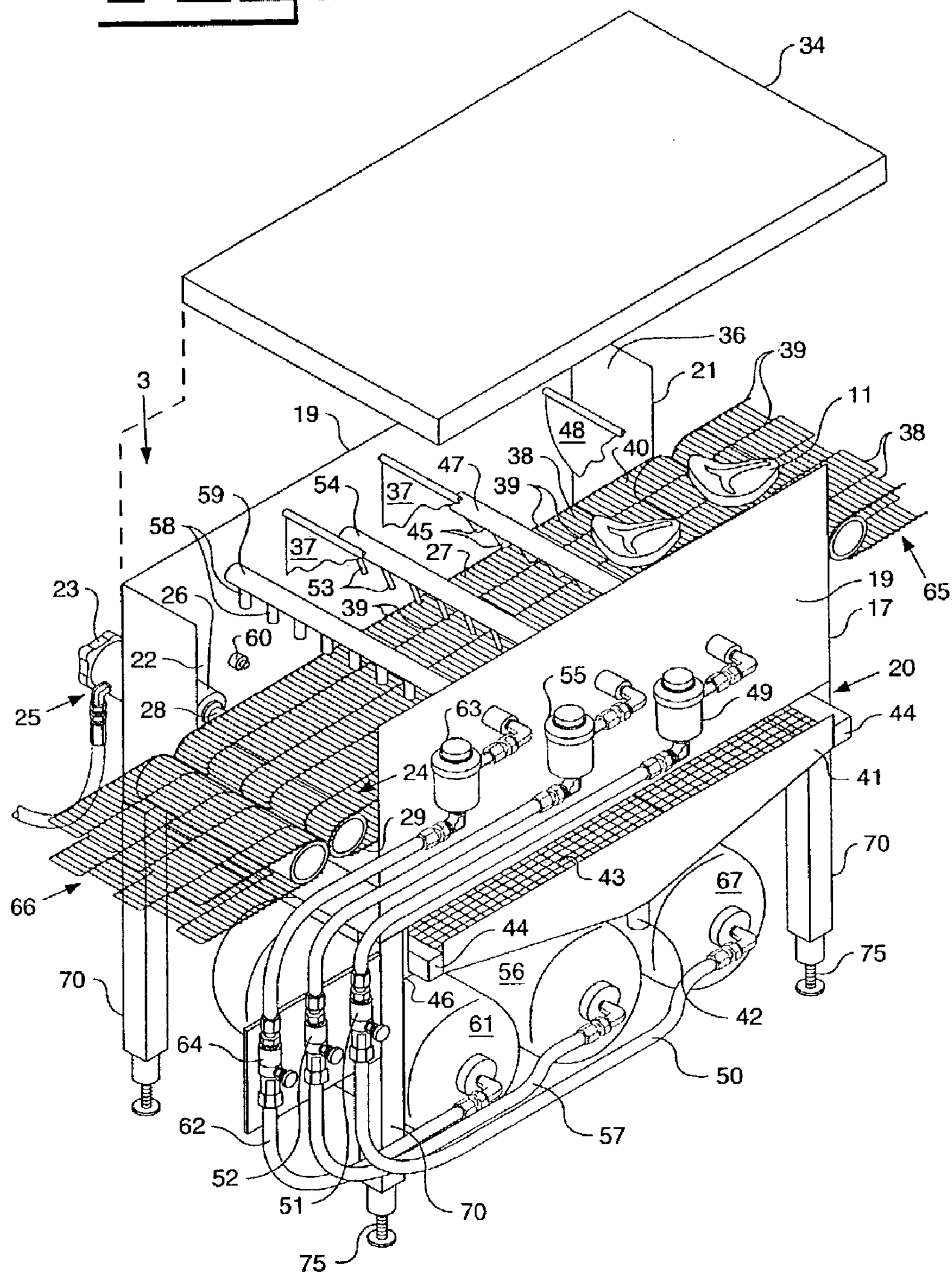
FIG. 2 is a perspective view of an apparatus useful for removing cutting residue from the surface of the cut meat and illustrates a drain tray in a partially extended position.
Figure 3:
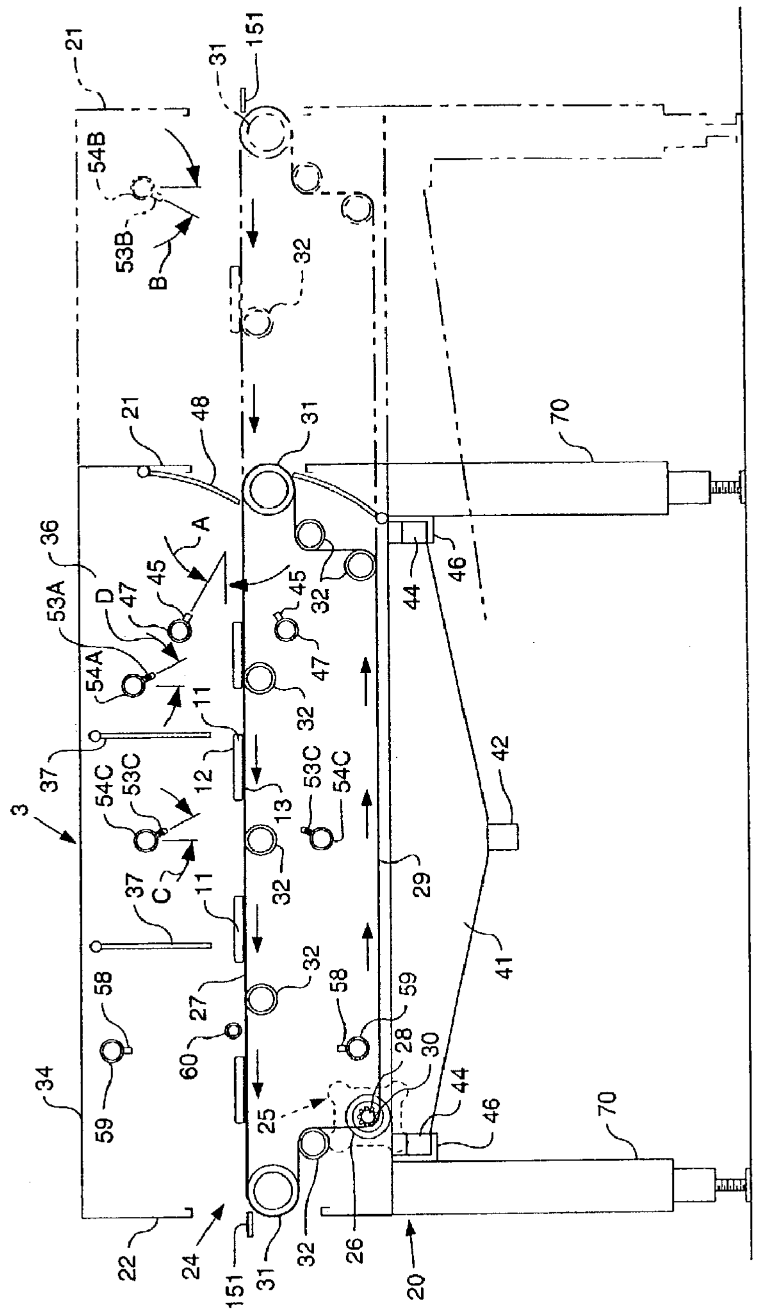
FIG. 3 is a side elevational section view showing details of the inside of the apparatus shown in FIG. 2 and showing, in phantom outline, alternative structure.

As seen in FIG. 1, meat processing apparatus, designated generally as 1, includes a meat cutting device station 2, a meat cleaning device station 3, a meat inspection station 4, a weighing device station 5, and a meat packaging device station 6. A meat trimming/styling station (not shown) may also be provided. One or more conveyors, designated generally in composite as 9, are used to transfer meat from one processing station to the next. The stations 2, 4, 5 and 6 are well known in the industry and need not be further described in detail herein. The cutting station 2 usually includes a band saw to cut the meat into discreet pieces 11 (FIG. 2) forming generally opposite cut surfaces 12 and 13 as best shown in FIG. 3. The meat cleaning station 3, described in detail below, may be used in combination with the stations 2, 4, 5 and 6 and may also be used as a freestanding device. Meat, as used herein includes beef, pork, lamb, fowl (e.g., chicken, turkey, etc.) and the flesh of other edible animals including fish.

The meat cleaning station 3 includes a housing 17 (FIGS. 2 and 3) comprised of a pair of generally parallel and spaced apart side walls 19 upstanding from a base 20. The housing 17 has an entrance end 21 and an exit end 22. The cleaning station 3 further includes a conveyor belt 24 powered by a drive 25. The drive 25 may include any suitable motor 23, such as an electric motor, or hydraulic motor and may include a torque limiter such as a clutch 26. A suitable hydraulic motor is a White, WHT RSO0304010N nickel plated hydraulic motor from Precision Industries of Hopkinsville, Ky. and a suitable clutch is a H-TLC-1000 Torque Limiter from Zero-Max Inc. of Plymouth, Minn. Preferably, the belt speed is in the range of between about 5 fpm and about 45 fpm. The drive 25 includes a shaft 28 connected to the clutch 26 having toothed gears 30 as best shown in FIG. 3 that have teeth which engage the below described chain type belt of the conveyor 24 adjacent the exit end 22. The drive 25 may be located between a top run 27 and a bottom run 29 of the conveyor 24. The top run 27 moves from the entrance end 21 to the exit end 22 and the bottom run 29 moves from the exit end 22 to the entrance end 21. The conveyor 24 is preferably of an open weave chain type belt having a relatively large percentage of its area open to provide exposure of the surface 13 of meat 11 resting thereon. Such conveyors are well known in the art and an acceptable conveyor belt is a Flexx Flow ½ pitch×0.072 wire type belting available from Lumsden Corp. of Lancaster, Pa. The belt of the conveyor 24 passes around a pair of belt guides 31 for support and change in direction of movement. One or more supports 32, such as idler rollers or static bars may be also provided to reduce sagging of the conveyor 24 within the housing 17. A cover 34 may also be provided for positioning over the conveyor 24 and is preferably removable or movable to an out of the way position to provide access to the interior 36 of the housing 17. Baffles 37 may be provided to separate the interior 36 into connected chambers.

The conveyor 24, as described above, preferably includes a plurality of longitudinally spaced apart transverse rod portions 38 interconnected by longitudinally extending rod portions 39 forming a generally open weave belt arrangement. There are openings 40 between the transverse and longitudinal rod portions 38 and 39, respectively, with the openings preferably being at least about 50% of the belt's total area.

The base 20 preferably includes a collection or catch pan 41 which includes one or more drains 42 (FIG. 3) in the event the fluid used for contact with the meat 11 contains liquid. If more than one liquid is used in the cleaning station 3, the pan 41 may be constructed with one or more partitions (not shown) to segregate the various liquid spray components for either recycling or for transfer to processing equipment for further processing as waste as is known in the art. The drain pan 41 is preferably removably mounted under the housing 17. Preferably the drain pan 41 is moveable transverse to the direction of movement of the conveyor 24 for convenience. The drain pan 41 has a guide 44 at each end thereof supported on support tracks 46 secured to legs 70 of the base 20. As shown, the tracks 46 are in the form of angles and the guides 44 are in the form of sealed square tubing. As shown, the pan 41 is generally V-shaped to help induce collected liquid(s) to flow to one or more drains 42, one drain being shown for convenience. A screen 43 may be mounted in the upper portion of the pan 41 to filter out larger particles to prevent them from being discharged through the drain 42.

As seen, one or more nozzles or vents 45 may be provided on each of opposite sides of the top conveyor run 27 and directed for impinging a stream of fluid preferably in the form of a thin flat fan onto one or more cut surfaces of the meat pieces 11. It is preferred that there be a plurality of upper nozzles 45 and a plurality of lower nozzles 45. The upper nozzles 45 and lower nozzles 45 form upper and lower groups with each group extending generally transversely across the opposed sides of the top run 27. An acceptable nozzle 45 is a model H-VVL-1/4-SS-80-04 from Spraying Systems Co. of Wheaton, Ill. It is preferred that the nozzles 45 be connected to a manifold 47 and be directed either generally normal to the respective meat surface 12 or 13 or in the direction opposite to the direction of movement of the top run 27 and the meat pieces or cuts 11 thereon, i.e., toward the trailing end of the meat pieces. The nozzles 45 on one side of the top run 27 are directed generally toward the nozzles on the other side of the top run. The angle A, as best seen in FIG. 3, is in the range of between about 30° and about 90° preferably in the range of between about 40° and about 80° and most preferably in the range of between about 45° and about 60° from the plane of the top run 27 of the conveyor 24. Deflector shields 48 can be mounted on the housing 17 to help keep liquid from the nozzles 45 within the housing 17. In an alternative embodiment as shown in phantom outline in FIG. 3, the housing 17 may also have a portion of sufficient length upstream (toward the inlet end 21) of the nozzles 45 to eliminate the need for a shield 48 at the entrance end 21. In the latter embodiment, it has been found that having the housing 17 extend beyond the nozzles 45 at least about twelve (12) inches has been found effective, but will depend on the angle A. The nozzles 45 are connected to a source 67 (FIG. 2) of pressurized fluid which preferably includes liquid by a feed line 50. The impinging fluid has velocity (or kinetic energy) adequate to remove a substantial portion, preferably at least about 70%, of the cutting residue. It is preferred that the pressure of the fluid inside the nozzle 45 be in the range of between about 25 PSI and about 500 PSI, preferably in the range of between about 40 PSI and about 250 PSI, and more preferably in the range of between about 50 PSI and about 150 PSI. It is preferred that the nozzles 45 be positioned in the range of between about ½ inch and about 4 inches, preferably in the range of between about ¾ inch and about 3 inches, and more preferably in the range of between about 1 inch and about 2 inches from the respective meat surface 12 or 13 onto which they will direct pressurized fluid. The kinetic energy of the streams from the nozzles 45 should be low enough and the angle of the streams should be such so as to not separate muscle fiber and/or muscle/fat/bone interfaces.

The nozzles 45 are constructed to provide an acceptable spray pattern. The spray pattern may be fixed by the shape of the nozzle discharge orifice. It is preferred that the spray pattern be in the form of a flat fan with the fan extending generally transverse to the direction of movement of the meat pieces 11. The spray pattern from the nozzles 45 may be continuous or pulsed.

A filter 49 may be provided in the feed line 50 for the nozzles 45 to clean the fluid, preferably liquid, before it is impinged onto the meat surface 12 and/or 13. Suitable control devices 51 such as a valve and pressure regulator may be provided in the line 50. The used liquid may be collected in the pan 41 and can be recycled or cleaned for reuse or may be sent for waste water treatment. It is preferred that the fluid be liquid, which liquid preferably includes a substantial portion of water. The fluid is at a temperature of less than about 70° F., preferably less than about 50° F., and more preferably less than about 35° F. Ingredients may be added to the cleaning liquid with such ingredients including approved sanitizers, colorants, flavors and protein enhancers as are known in the art. It is recognized and anticipated that the liquid may also include a wide variety of other liquids and ingredients not specifically referenced above.

In the illustrated structure, the upper surface nozzles 45 are positioned generally above the lower surface nozzles 45. However, it is to be understood that the upper and lower groups of nozzles 45 may be staggered along the length of the top run 27 of the conveyor 24 if desired.

When liquid is used for spraying on the meat pieces 11 to remove cutting residue therefrom, it is desirable to remove the retained liquid from the meat surfaces 12 and/or 13. As best seen in FIGS. 2 and 3, downstream of the cleaning nozzles 45, there is provided means for removing retained liquid from the meat surfaces 12 and 13. In a preferred embodiment, air or other suitable gas is impinged onto the wet meat surfaces 12 and/or 13 to blow off cleaning liquid. This may be done by one or more nozzles or vents 53, with at least one nozzle 53 connected to a respective manifold 54 and positioned for impinging a stream of air onto a respective side 12 or 13 of the meat pieces 11, either simultaneously or in sequence as described above for the nozzles 45. Preferably, there are a plurality of upper nozzles 53 and a plurality of lower nozzles 53. The upper nozzles 53 and the lower nozzles 53 form upper and lower groups that are positioned in a respective pattern extending generally transversely across the top run 27. An acceptable nozzle 53 (denoted 53A, 53B and 53C at various locations for clarity) is a model AA727-1/4-SS-11 available from Spraying Systems Co. The gas is provided from a pressurized source 56 (FIG. 2) of gas connected to the manifolds 54 (denoted 54A, 54B, 54C at various locations for clarity) by a feed line 57. It is preferred that the gas from the nozzles 53C be directed onto the meat in a thin flat fan and may be directed generally at a forwardly directed angle C, as measured from the vertical, in the range of between about 0° and about 60° preferably in the range of between about 10° and about 45° and more preferably in the range of between about 20° and about 30° so that a substantial portion of the retained liquid is blown toward the trailing end of the meat 11.

As seen in FIGS. 3 and 4, a gas manifold 54A can be positioned above the top run 27 and between the baffle 37 and the upper manifold 47. Its height above the top run 27 may be adjustable. The angle D of the nozzles 53A is forwardly directed and is in the range of between about 0° and about 60°, preferably in the range of between about 20° and about 30° and more preferably in the range of between about 20° and about 25° from the vertical. An angle D of 25° has been found very effective. The spray fans from the respective nozzles 53 preferably extend generally transversely across the upper run 27. The gas pressure inside the nozzles 53 is preferably in the range of between about 5 PSI and about 50 PSI, preferably in the range of between about 10 PSI and about 25 PSI, and more preferably in the range of between about 10 PSI and about 20 PSI. The gas may be filtered by an inline filter 55. Control devices 52 such as a valve and pressure regulator may be connected in the line 57. The gas may be impinged on the meat in a continuous manner or in a pulsed manner generally as described above for the cutting residue cleaning spray. The temperature of the gas is preferably less than about 55° F., preferably less than about 45° F., and more preferably less than about 40° F. A particularly preferred temperature is about 35° F. As described above for the spray streams from nozzles 45, the spray streams from nozzles 53 should also not damage the meat tissue and/or interfaces.

As can be seen in FIGS. 3 and 4, a third gas manifold can be provided between the inlet 21 and the nozzles 45. The manifold 54B is preferably positioned above the top run 27 and the nozzles 53B associated therewith are rearwardly directed, i.e., toward the exit end 22. The angle B, as measured from the vertical, is in the range of between about 0° and about 60°, preferably in the range of about 20° and about 30°, more preferably in the range of about 20° and about 25°. An angle of about 22° has been found to be effective. These angle values, although numerically the same as for the angle D, are in the reverse direction. The manifold 54B and nozzles 53B are utilized when the housing is extended as shown in phantom outline in FIG. 3, thereby eliminating the need for the upper baffle 48. The manifolds 54 and nozzles 53 can be connected through a common conduit to a source of pressurized gas. The manifolds 54A and their nozzles 53A may be connected to a conduit connected to a source 56 of gas as herein described in combination with the manifolds 54B and 54C and their nozzles 53B and 53C. The various gas emitting nozzles and manifolds may also be separately connected to one or more sources of gas and independently regulated and filtered to provide different operating pressures and different filtration levels or to extend the life of the filters by reducing the airflow volume therethrough.

Gases other than air may be used. Those gases include nitrogen, carbon dioxide and other inert gases and combinations thereof.

It may be advantageous to provide the cleaning apparatus 3 with means for applying brine, as is known in the art, or other materials, to the cleaned and dried meat surfaces 12 and/or 13. Brine is applied for sanitizing and/or coloring purposes and is usually applied in the form of an aqueous solution. The brine may be sprayed on through one or more nozzles 58 and preferably from generally opposed nozzles 58 with each nozzle impinging a stream of brine on a respective side 12 or 13 of the meat pieces 11. The nozzles 58 are connected to manifolds 59. An acceptable nozzle 58 is a model 1/4-TT-SS+TPU650025 from Spraying Systems Co. Brine may be applied as a low pressure spray. Generally, brine is applied at a temperature of less than about 55° F., preferably less than about 45° F. and more preferably less than about 40° F. A particularly preferred temperature is in the range of between about 35° F. and about 40° F. The pressure in the brine nozzle 58 is in the range of between about 30 PSI and about 150 PSI, preferably in the range of between about 60 PSI and about 120 PSI and more preferably in the range of between about 80 PSI ad about 100 PSI. The brine spray may be continuous or intermittent. If intermittent, the brine spray may be turned on and off and may be on only when a piece of meat is passing by the brine nozzles 58. Spray on and off may be triggered by detector means 60 such as photoelectric eyes, computer imaging or the like. When a piece of meat 11 is sensed, the brine spray would be turned on and when the piece of meat has passed by the nozzle 58, the brine spray may be terminated. The nozzles 58 are connected to a source 61 of pressurized brine by a feed line 62. The nozzles 58 may be directed at any suitable angle and preferably generally perpendicular to the top run 27. A filter 63 may be connected in the feed line 62. Control devices 64 such as a valve and pressure regulator may also be connected in the feed line 62.

The nozzles 58 may be used to apply other materials such as sauce, flavorants, protein enhancers and other ingredients in addition to or in lieu of the ingredients of brine.

An infeed conveyor 65 (FIG. 2) may feed the conveyor 24 in the cleaning apparatus 3 and the cleaned meat 11 may be removed from the cleaner via an outfeed conveyor 66 (FIG. 2). It is preferred that the bone end of the cut meat be the leading end as the cut meat pieces 11 travel through the cleaning device 3. This results in better cleaning of the exposed edge of the bone than when it is at the trailing end or at the side.

As shown, it is preferred to have the housing 17 mounted on the base 20 with legs 70 as described above and to have the cleaning device 3 selectively movable relative to the infeed conveyor 65 and the outfeed conveyor 66. This allows the cleaning device 3 to be easily moved to other processing lines and to be removed for repair or replacement. It is preferred that the heights of the housing 17 and conveyor 24 be adjustable to match the height of the conveyors 65 and 66 as with leveling feet or pads 75 secured to the legs 70. The legs 70 may also be of a type having adjustable lengths as is known in the art.

FIG. 4 illustrates an alternative embodiment of the present invention. The construction of this embodiment is similar to the construction of the embodiment of the present invention shown in FIGS. 2 and 3 and has an extended inlet end eliminating the need for the entry baffle 48 which is similar in construction to the alternate embodiment shown in FIG. 3 wherein the extended entry end is shown therein in phantom outline. Like numbers designate like or similar parts. The cleaning station 103 includes a housing 117 comprised of a pair of generally parallel and spaced apart side walls 119 upstanding from a base 120. Housing 17 has an entrance end 121 and an exit end 122. The cleaning station 103 further includes a conveyor belt 24 powered by a drive 25. For simplicity sake, the apparatus 103 will not be described in detail but the parts are numbered in accordance with the above description and that description applies hereto. The catch pan 41 is shown partially removed from the apparatus 103. As seen, there is a first air manifold 54B and nozzles 53B positioned between the inlet end 121 and the upper manifold 47 and its nozzles 45. Baffles 37A and 37B are positioned on opposite sides of the manifold 54B and nozzles 53B. As seen, the manifold 54B is connected to a conduit 57 and to a source 56 (see FIG. 2) of pressurized gas. As seen, the manifolds 54B and 54A are positioned above the top run 27. A pair of compressed gas manifolds 54C are provided, one above the top run 27 and one below the top run 27 each having their respective nozzles 53C directed at the top run 27 and the meat carried thereby. As shown, the manifolds 54C are also connected to a conduit 57 which may be connected to the same source 56 of compressed gas. It is to be noted that the conduit 57 for the manifolds 54A, 54B and 54C may each be connected to a different source 56 of pressurized gas with the sources being shown in FIG. 2. A baffle 37C is positioned between the manifolds 54C and the manifold 54A. Additionally, a baffle 37D is positioned between the manifold 54C and the brine nozzles 58.

The cleaning station 103 as shown in FIG. 4 has a hingedly mounted lid 134 with generally triangularly shaped end panels 140 connected and extending between a top panel 143 and a side panel 145. Such a lid construction permits easy access to the interior of the cleaning station 103 while maintaining the lid structure 134 attached to the machine. As seen only in FIG. 3 for simplicity, a transfer plate 151 may be provided adjacent to the inlet ends 21 or 121 and outlet ends 22 or 122 of the conveyor belt 24 to help the cut meat 11 transfer from the infeed conveyor 65 and the outfeed conveyor 66. Such transfer plates are well known in the art.

While in a preferred embodiment, both sides of cut meat pieces are treated at the same time, an alternate embodiment may provide a one sided cleaner and means within the cleaner for turning the meat pieces over exposing a second side of the cut meat for cleaning.

In use of the present invention, it was surprisingly found that yield was improved by about 1.5% by weight compared to cleaning by scraping. The surface appearance of the cut meat was also improved.

The present invention provides an improved method of and apparatus for processing meat.

Thus, there has been shown and described several embodiments of a novel method of and apparatus for processing meat. As is evident from the foregoing description, certain aspects of the present invention are not limited by the particular details of the examples illustrated herein and it is therefore contemplated that other modifications and applications, or equivalents thereof, will occur to those skilled in the art. Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. An apparatus for processing meat, said apparatus including:

a conveyor for conveying a cut meat along a path of conveyance;

a cleaning station having a housing through which the path of conveyance extends, said cleaning station including at least one fluid nozzle communicably connected to a high pressure fluid source and operable for directing a stream of fluid from the nozzle onto a first cut surface of the meat in a direction to forcibly remove cutting residue from the first cut surface of the meat while the meat is being moved by said conveyor; and said cleaning station further including a first gas nozzle communicably connected to a high pressure gas source and disposed downstream from the fluid nozzle along the path of conveyance and operable for directing a stream of gas from the first gas nozzle onto the first cut surface to blow off fluid.

2. The apparatus as set forth in claim 1 further including at least one second gas nozzle located downstream of the at least one first gas nozzle operable for directing a stream of gas onto the first cut surface of the meat, said second gas nozzle being connected to a source of pressurized gas.

3. The apparatus as set forth in claim 2 including at least one second fluid nozzle directed at a second cut surface of the meat and operable to direct a stream of fluid onto said second cut surface of the meat.

4. The apparatus as set forth in claim 3 including at least one second gas nozzle directed at the second cut surface of the meat downstream of the at least one first gas nozzle directed at the second cut surface of the meat and operable for directing a stream of gas into the second cut surface of the meat.

5. The apparatus as set forth in claim 4 including a device for applying a gas stream to the first and second cut surfaces of the meat upstream of the at least one fluid nozzle.

6. The apparatus as set forth in claim 4 wherein said conveyor includes an open weave conveyor belt portion in the cleaning device with an upper run for carrying cut meat, said conveyor belt portion having an upper face and a lower face.

7. The apparatus as set forth in claim 6 wherein at least one fluid nozzle and at least one second fluid nozzle are positioned on each of the opposite sides of the upper run.

8. The apparatus as set forth in claim 6 wherein said at least one fluid nozzle is directed at an angle in the range of between about 30° and about 90° relative to the plane of the upper run.

9. The apparatus as set forth in claim 2 including a catch pan associated with the cleaning station and disposed under the cleaning station and operable to collect liquid discharged from the at least one fluid nozzle and where said pan has at least one partition for separating fluids and said pan moveably mounted on tracks on which the pan is adapted to transverse along the path of conveyance.

10. An apparatus for cleaning a cut surface of meat, said apparatus including:

a housing, said housing having an entry end and an exit end;

a conveyor positioned in the housing for transferring cut meat in a direction from the entry end to the exit end, said conveyor having an upper run for carrying cut meat;

at least one first fluid nozzle included with said housing and communicably linked to a high pressure fluid source and positioned above said conveyor and operable for directing a stream of fluid from the nozzle onto a cut surface of meat, said stream directed in a direction to forcibly remove cutting residue from a first cut surface of the meat while the meat is being moved by said conveyor; and at least one first gas nozzle included with said housing and disposed downstream from said fluid nozzle and communicably linked to a high pressure gas source and positioned above said conveyor and operable for directing a stream of gas from the nozzle onto a cut surface of meat, said stream directed in a direction to forcibly remove fluid residue from a first cut surface of the meat while the meat is being moved by said conveyor.

11. The apparatus as set forth in claim 10 further including at least one second gas nozzle downstream of the at least one first gas nozzle operable for directing a stream of gas onto the first cut surface of the meat, said second gas nozzle being connected to a source of pressurized gas.

12. The apparatus as set forth in claim 11 wherein at least one first fluid nozzle is directed at a second cut surface of the meat and is operable to direct a stream of liquid onto said second cut surface of the meat.

13. The apparatus as set forth in claim 12 wherein at least one third gas nozzle is directed at the first cut surface of the meat upstream of the at least one first fluid nozzle directed at the first cut surface of the meat and is operable for directing a stream of gas unto the first cut surface of the meat.

14. The apparatus as set forth in claim 13 including a device for applying liquid to the first and second cut surfaces of the meat downstream of the at least one second nozzle.

15. The apparatus as set forth in claim 13 wherein said conveyor includes an open weave conveyor belt portion with an upper run for carrying cut meat, said conveyor belt portion having an upper face and a lower face.

16. The apparatus as set forth in claim 15 wherein at least one first fluid nozzle and at least one second fluid nozzle are positioned on opposite sides of the upper run.

17. The apparatus as set forth in claim 15 wherein said at least one first nozzle is directed at an angle in the range of between about 30° and about 90° relative to the plane of the upper run.

18. The apparatus as set forth in claim 11 including a catch pan associated with the housing and operable to collect liquid discharged from the at least one first nozzle.

* * * * *